Aug. 7, 1962 W. H. LOCKWOOD 3,048,302
NESTING AND STACKING CONTAINERS
Filed March 18, 1960 6 Sheets-Sheet 3

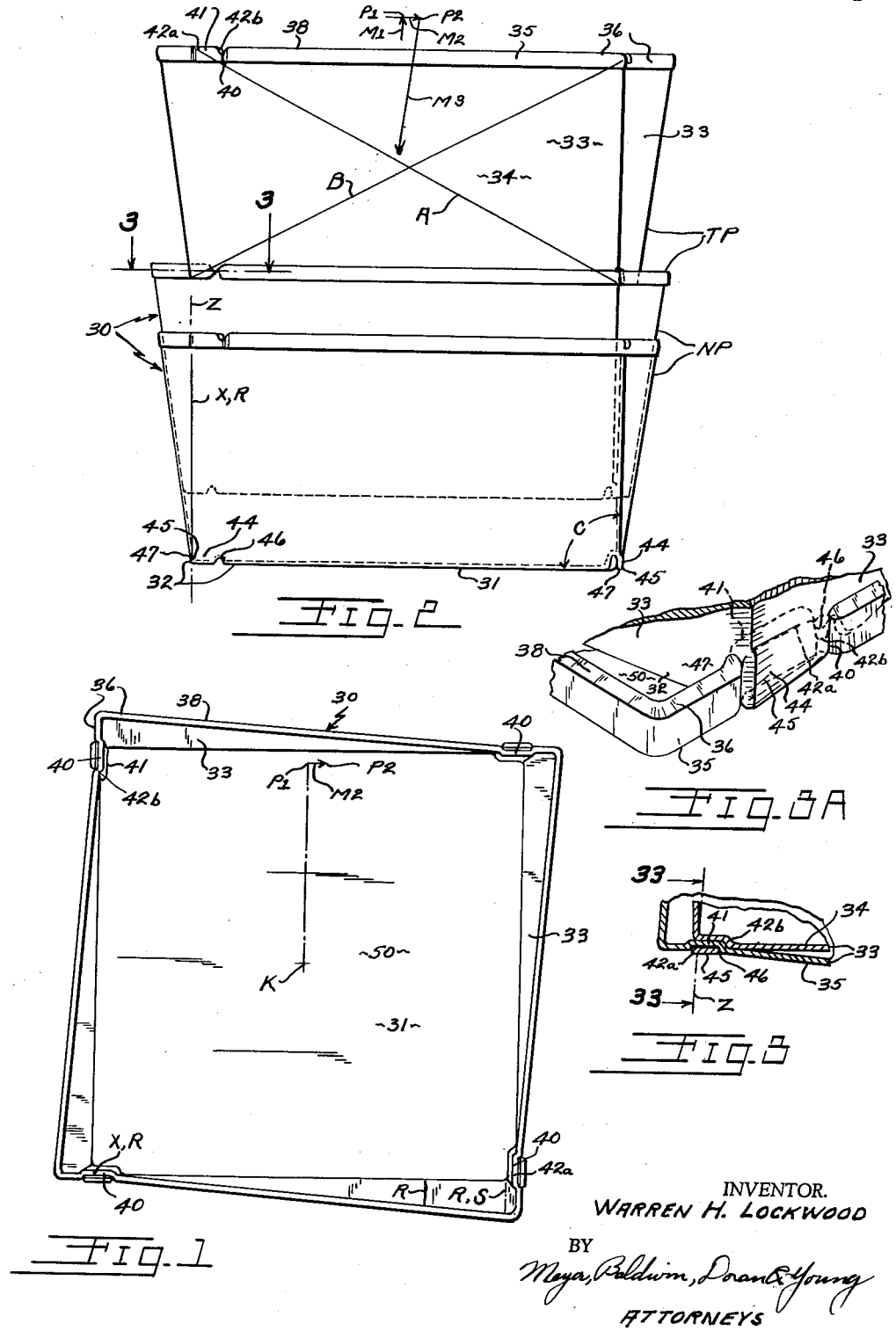
Aug. 7, 1962   W. H. LOCKWOOD   3,048,302
NESTING AND STACKING CONTAINERS
Filed March 18, 1960   6 Sheets-Sheet 1
INVENTOR.
WARREN H. LOCKWOOD
BY
Meyer, Baldwin, Doan & Young
ATTORNEYS

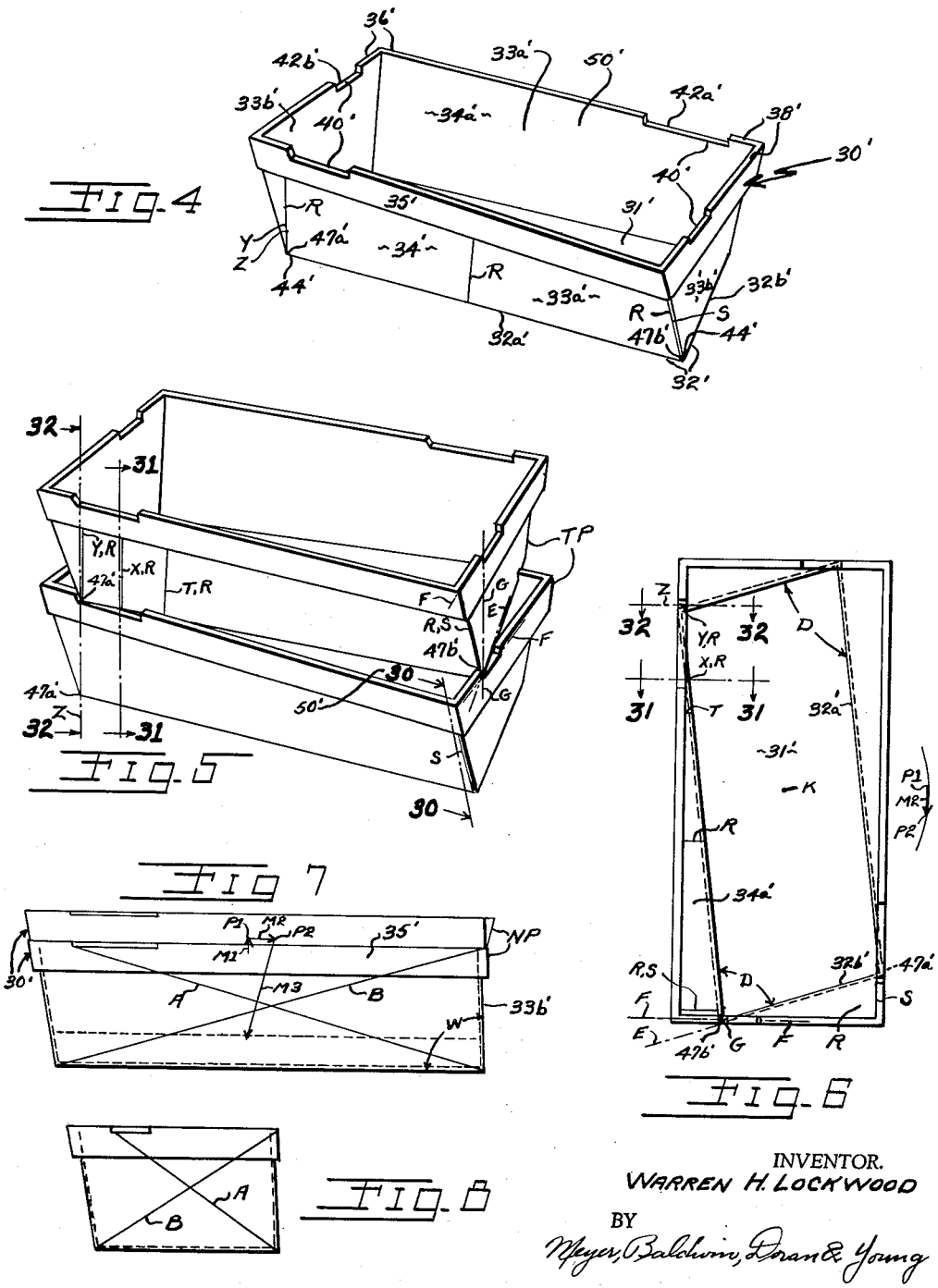

INVENTOR.
WARREN H. LOCKWOOD
BY
Meyer, Baldwin, Doran, Young
ATTORNEYS

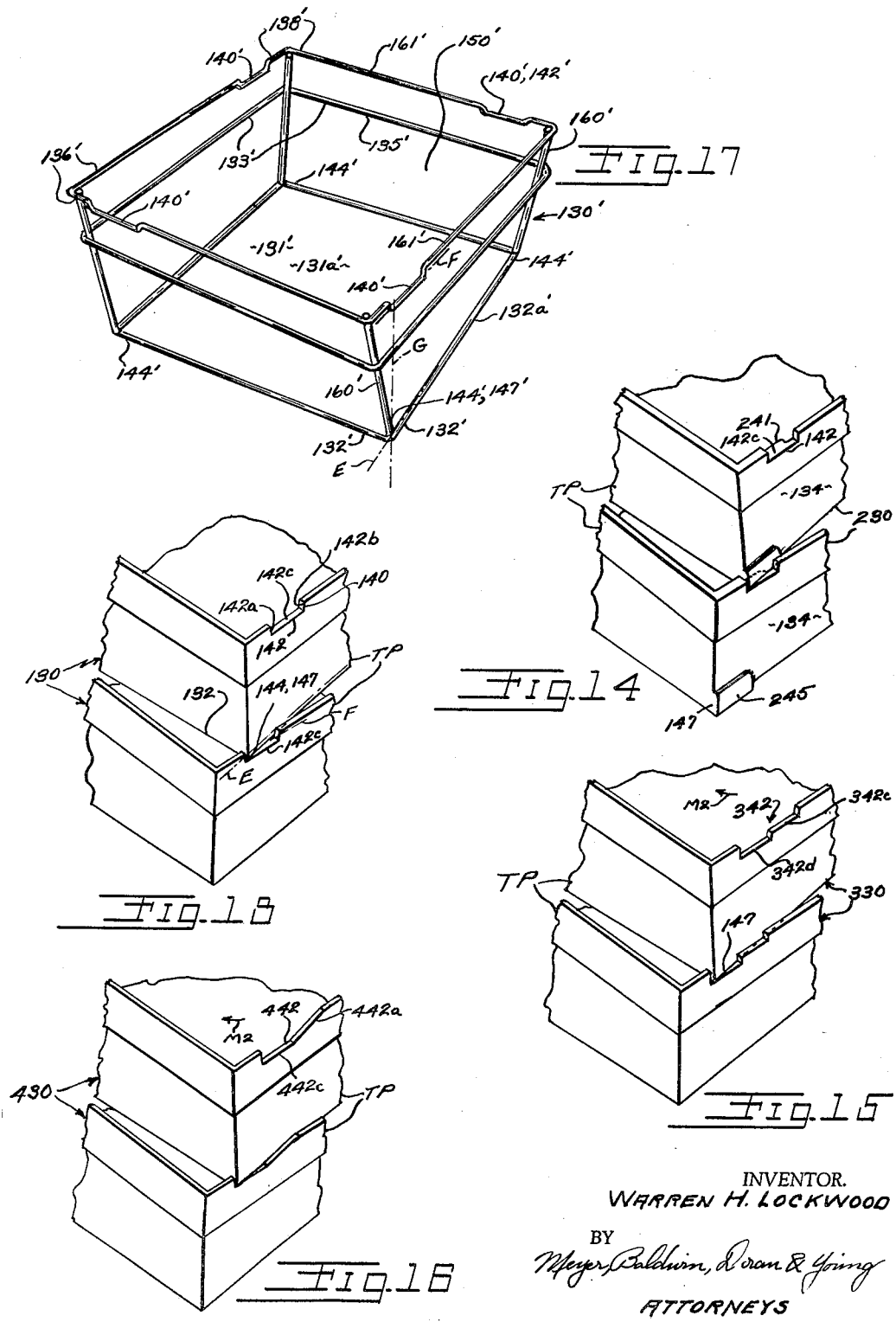

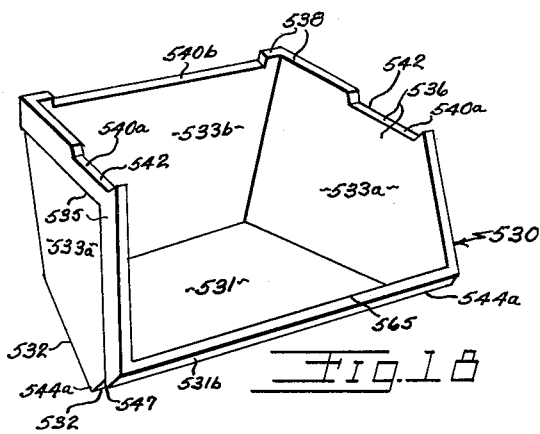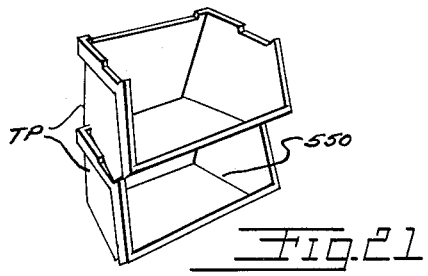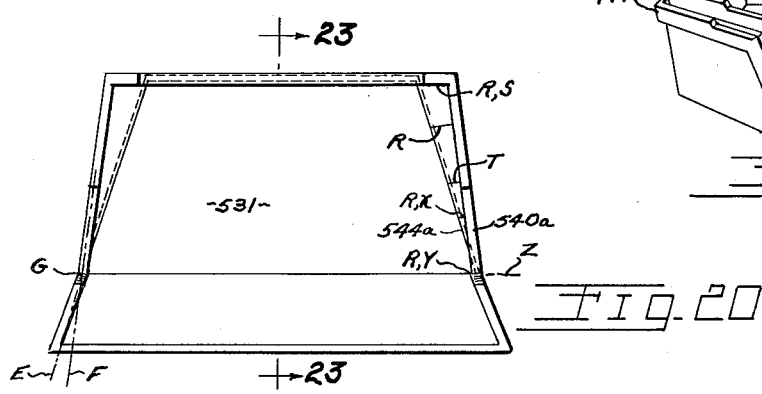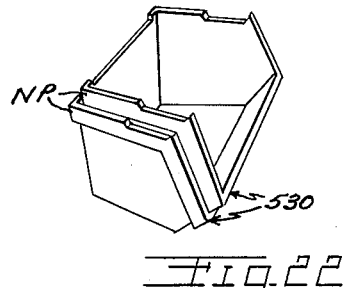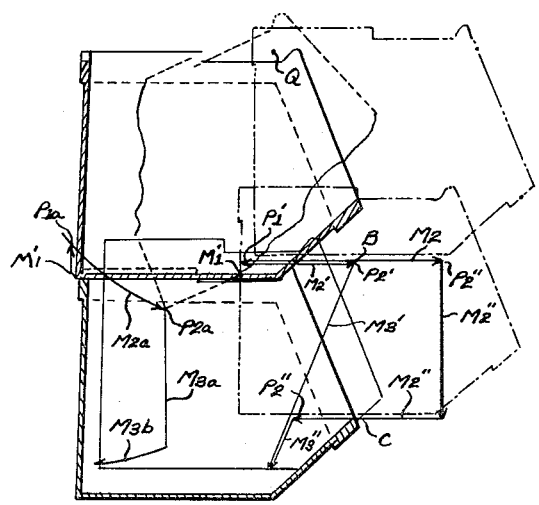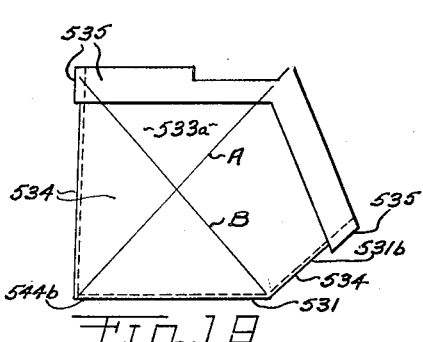

Aug. 7, 1962  W. H. LOCKWOOD  3,048,302
NESTING AND STACKING CONTAINERS
Filed March 18, 1960  6 Sheets-Sheet 6
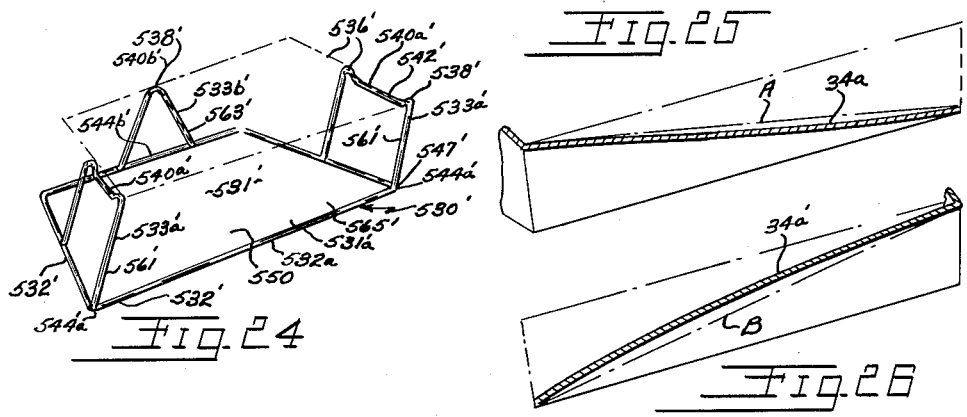
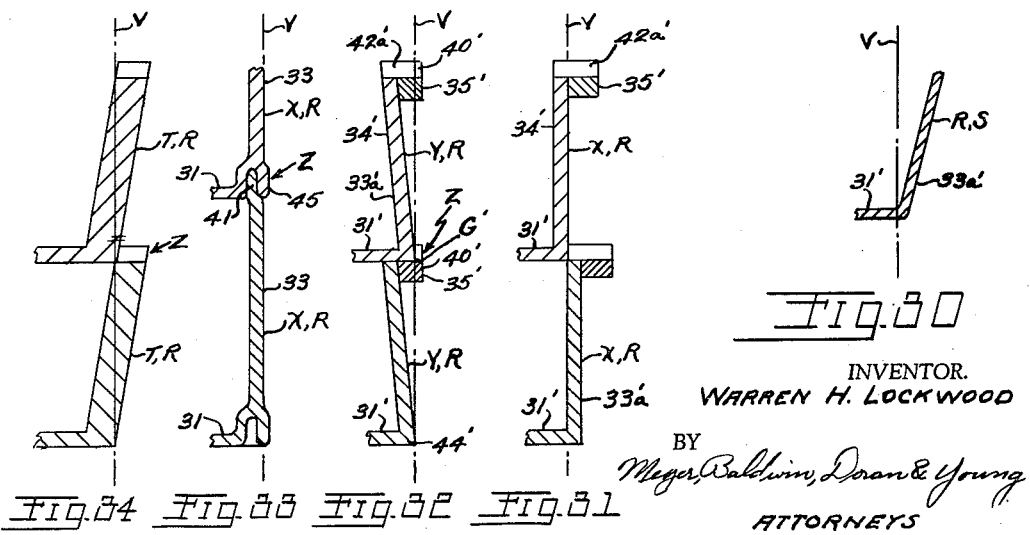
INVENTOR.
WARREN H. LOCKWOOD
BY
Meyer, Baldwin, Doran & Young
ATTORNEYS United States Patent Office 3,048,302
Patented Aug. 7, 1962

3,048,302
NESTING AND STACKING CONTAINERS
Warren H. Lockwood, Downey, Calif.
(1329 Granvis Altamira, Palos Verdes Estates, Calif.)
Filed Mar. 18, 1960, Ser. No. 16,006
12 Claims. (Cl. 220—97)

This invention relates to improvements in containers, trays or receptacles, and more particularly in that type adapted to be tiered when in use and to be nested when empty.

Whenever in the specification and claims these containers or receptacles are referred to as "receptacles," it is intended that this term includes containers, trays, crates, boxes, baskets, skids, pallets, flats, display receptacles, and similar receptacles or article carrying devices which may be stacked or tiered one upon another when in use and nested when empty for conservation of space.

One of the objects of the present invention is to provide a tierable and nestable receptacle having no moving parts, having rigidly connected upper and lower tiering support portions to provide tiering, and adapted to have at least some of its side wall portions formed of solid construction.

A further object of the present invention is to provide a tierable and nestable receptacle having each of its side walls having portions lying along the surface of a warped surface.

A further object of the present invention is to provide a receptacle characterized by its inexpensive manufacturing cost, ease of assembly of its component parts, structural simplicity, strong and sturdy nature, compactness in nesting relationship with like receptacles, multiplicity of functional advantages, and/or ease of assembly with like receptacles in either tiered or nested relationship.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

FIG. 1 is a top plan view of a first form of receptacle;

FIG. 2 is a side elevational view of three like receptacles of the type shown in FIG. 1 with the lower two receptacles in nesting position and the upper two receptacles in tiering position;

FIG. 3 is a horizontal sectional view taken along the line 3—3 in FIG. 2 through a portion of these receptacles;

FIG. 3a is a perspective view of the portion of the receptacles cut by line 3—3 in FIG. 2;

FIG. 4 is a perspective view of a second form of receptacle;

FIG. 5 is a perspective view of two of the receptacles from FIG. 4 in tiering position;

FIG. 6 is a top plan view of one of the receptacles from FIG. 4;

FIG. 7 is a side elevational view of like receptacles of the type in FIG. 4 in nesting position;

FIG. 8 is an end elevational view of the receptacle in FIG. 4;

FIG. 13 is a perspective view of an enlarged portion of one corner of the receptacles shown in FIG. 11;

FIGS. 14, 15 and 16 are respectively perspective views of fourth, fifth and sixth forms of the receptacle with each form having a slight modification and shape of the upper and lower tiering support portions shown in FIG. 13;

FIG. 17 is a perspective view of a seventh form of receptacle similar in outline shape to the receptacle shown in FIG. 9;

FIG. 18 is a perspective view of an eighth form of receptacle;

FIG. 19 is a side elevational view of the receptacle in FIG. 18;

FIG. 20 is a top plan view of the receptacle in FIG. 18;

FIGS. 21 and 22 are perspective views of two receptacles, of the type shown in FIG. 18, in tiering and nesting positions respectively;

FIG. 23 is a vertical sectional view taken along the line 23—23 in FIG. 20 of two receptacles in tiering position showing the several different paths of movement the upper receptacle may take in moving from the tiering position in FIG. 21 to the nesting position in FIG. 22;

FIG. 24 is a perspective view of a ninth form of receptacle corresponding in many respects with receptacles shown in FIG. 18;

FIGS. 25 and 26 are sectional views through straight diagonals of a rectangle and the warped side wall portions to show the relationship therebetween;

Figure 9:
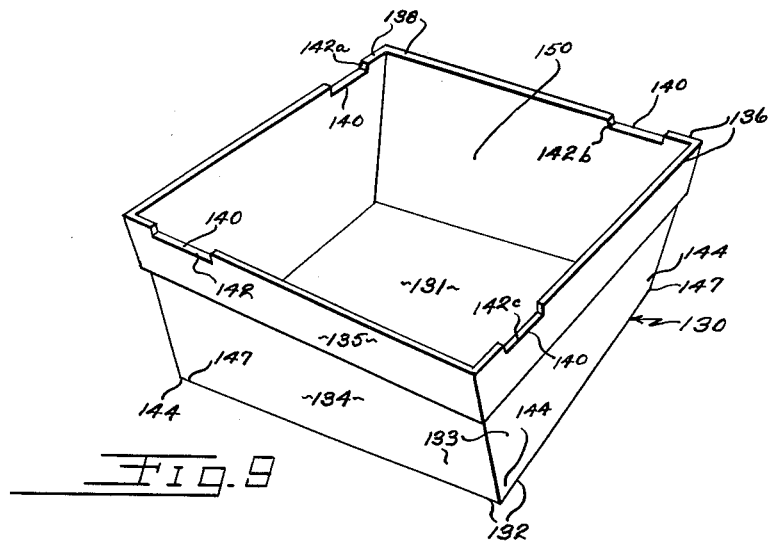
FIG. 9 is a perspective view of a third form of receptacle.

FIGS. 27, 28 and 29 are different views of two or more receptacles in nesting position, similar to FIG. 7, with two receptacles being shown in FIG. 27 with a plurality being shown in a single stack in FIG. 29, and with six of these stacks from FIG. 29 placed in side by side relationship in FIG. 28; while FIGS. 30, 31, 32, 33, and 34 are respectively vertical sectional views taken generally along lines 30—30, 31—31, and 32—32 in FIG. 5; along lines 33—33 in FIG. 3; and through an additional form of the invention in a position generally corresponding to that shown in FIG. 32.

Before the receptacles here illustrated are specifically described, it is to be understood that the invention here involved is not limited to the structural details or arrangement of parts here shown since receptacles embodying the present invention may take various forms. It also is to be understood that the phraseology or terminology herein employed is for purposes of description and not of limitation since the scope of the present invention is denoted by the appended claims.

FIGS. 1–3a show like receptacles 30. Each receptacle 30 has a plurality of rigidly, and preferably integrally, interconnected parts. It has bottom portion 31 and a plurality of side wall portions 33 rigidly connecting bottom portion 31 and upper edges 38 of the receptacle. These upper edges 38 are defined in any suitable manner and lie generally in a plane parallel to and spaced above bottom portion 31. Bottom portion 31 may be any suitable four sided geometric shape, such as a trapezoid or any suitable parallelogram wherein this parallelogram would include a conventional parallelogram with at least two acute angles, a rectangle or a square. The component parts of the receptacle define a receptacle encircling bottom periphery 32 having four corners 47 and a receptacle encircling top periphery 36. The four sides of four sided geometric shape 31 extend along the edges of the receptacle encircling bottom periphery 32. Each side wall portion 33 has its bottom extending along one of these geometric shape sides and its top extending along one of the edges of the receptacle encircling top periphery 36 and forms a portion thereof. It should be noted that each of the peripheries 32 and 36 include the same number of corners and connecting edges. Receptacle 30 has a plurality of upper tiering support portions 40 located in a first common horizontal plane; rigid with and formed in upper edges 38; and located on the edges, and spaced inwardly from the corners, of top periphery 36. The receptacle also has a plurality of lower tiering support portions 44 located in a second horizontal plane parallel to this first plane; rigid with bottom portion 31; located at at least some of the corners 47 of bottom periphery 32; and formed in an edge of side wall portion 33. Corresponding lower tiering support portions 44 are substantially vertically beneath corresponding upper tiering support portions 40. It will be apparent hereinafter that the description of the structure in this paragraph also applies generically to the same named parts in FIGS. 4–24. Referring to FIGS. 1, 6, 10 and 20, it will be noted that in each of these embodiments the bottom portion of the receptacle has four substantially straight sides, the means defining the upper edges of each receptacle has four substantially straight sides respectively paired with the corresponding bottom portion sides, and in the case of at least two of these last-named pairs, the respective sides are non-parallel.

Receptacle 30 in FIGS. 1–3, and each of the receptacles in FIGS. 4–24, may be made in any suitable manner and of any suitable material. Each can be made, either partially or wholly, of sheet metal of any suitable type, such as aluminum because it is light in weight; plastic molded construction; flat and warped wood pieces glued together; plywood construction with a polyvinyl coating; wire; etc.

Receptacle 30 in FIGS. 1–3 has solid side wall portions 33 capable of retaining within the receptacle liquid or small articles, such as vegetables or fruits, which would otherwise flow outwardly if the solid side wall portions were not used. Each side wall portion 33 includes a sheet-like member 34 of substantially uniform thickness extending along the full length of one edge of its bottom periphery 32 or bottom portion 31, having an outwardly extending framing bead 35 extending along at least some of the edges of top periphery 36, and having corresponding upper and lower tiering support portions 40 and 44 being formed respectively in the upper and lower edges of this sheet-like member 34. As will be more apparent hereinafter and as will be described in further detail, this sheet-like member 35 is of "warped" shape to permit like receptacles to be placed in tiering position TP, in nesting position NP, and to be moved between these positions. This warped shape brings lower tiering support portions 44 on the corners of bottom periphery 32 inwardly in one direction (see the left side of FIG. 2) from the corresponding corners in top periphery 36 so as to be vertically aligned with their corresponding upper tiering support portions 40. As will be apparent hereinafter, the description of the structure in this paragraph applies equally well to the same named parts in FIGS. 4–16, and 18–23. However, in FIGS. 1–3, these four sheet-like members 34, form four edges of the encircling top periphery 36 and form four corners of the receptacle at the intersection of adjacent members. Hence, upper edges 38 of side wall portions 33 form top periphery 36 in a continuous outline in generally a horizontal plane so that a liquid tight container is formed between side wall portions 33, periphery 36 and bottom portion 31. This is also true in FIGS. 4–16. However, the receptacle in FIGS. 18–23 has only three such sheet-like members forming only three edges of its encircling top periphery and forming only two corners at their intersections with the open fourth side being used for other purposes mentioned in more detail hereinafter.

The mode of operation should be readily apparent for placing like receptacles 30 in tiering position TP in FIG. 2, nesting position NP, or moving them between these positions. Like receptacle 30 is adapted for tiering and nesting with other like receptacles, as shown in FIGS. 2, 3 and 3a in the drawings.

Tiering position TP is easily assumed. Lower tiering support portions 44 of the uppermost receptacle in FIG. 2 are adapted to rest vertically down upon upper tiering support portions 40 of a lower like receptacle (shown as the middle receptacle in FIG. 2) to assume tiering position TP with the perimeters, including top peripheries 36, of the upper receptacle and of the lower receptacle (shown as the middle receptacle in FIG. 2) shown substantially vertically aligned. This tiering position TP is reached by lowering the upper receptacle downwardly from position P1 in FIG. 2 in a downward direction, opposite to raising movement M1 to be described in more detail hereinafter. In position TP, each notch 42 in an edge of top periphery 36 receives a lower tiering support portion 44 and a corner 47 of bottom periphery 32 of an upper like receptacle.

In position TP, receptacles 30 are prevented from having substantial relative movement in the horizontal plane. It should be apparent that not all four upper tiering support portions 40 and all four lower tiering support portions 44 need be constructed in the manner illustrated, or have their vertically extending surfaces positively engaged, to prevent this relative horizontal movement. If any two pairs (each pair includes a substantially vertically aligned single upper portion 40 and single lower portion 44) of tiering support portions are so formed and laterally engaged, this relative horizontal movement will be prevented. For example, substantial relative horizontal movement of the upper and lower like receptacle 30 in tiering position TP in FIG. 2 is prevented by the dimensions of the corners of the receptacle, and tiering support portion and notches. This is especially true if diagonally opposite pairs are so engaged. Locking notches 42 in the upper tiering support portions 40 are each formed wholly in a different edge of top periphery 36 with each adapted to receive in tiering position TP a lower tiering support portion 44 at a different corner of bottom periphery 32 of the upper like receptacle.

The shape of the side wall portions 33 is constructed and arranged so that two like receptacles 30 will nest one within another in nesting position NP in FIG. 2.

The upper like receptacle 30 in tiering position TP in FIG. 2 is easily moved from tiering to nesting position with respect to its lower like receptacle in position TP so that they will assume a nesting position similar to nesting position NP in FIG. 2. The uppermost receptacle in FIG. 2 is raised by raising movement M1 to unshifted position P1 so as to disconnect the tiering support portions 40 and 44, moved by a shifting movement M2 to shifted position P2, and moved by a lowering movement M3 down to the proper nesting level in the lower like receptacle, as shown by that level occupied by lower tiering support portions 44 on the middle receptacle in FIG. 2 when two like receptacles are in the nesting position NP. Lowering movement M3 is possible because the dimensions of the upper and lower parts of each receptacle 30 permit the lower part of an upper receptacle to enter into a lower like receptacle because there is a clearway 50 formed between side wall portions 33 in each receptacle from the level of its upper tiering support portions 40 down to the aforedescribed nesting level in the receptacle occupied by the lower tiering support portions of the adjacent upper, nested receptacle. The dimensions of the upper and lower parts of each receptacle 30 also permits a shifting movement required during shifting movement M2 and lowering movement M3.

As will be apparent hereinafter, the description of the mode of operation in the preceding paragraphs also applies generically to the same parts, positions and movements in FIGS. 4–24.

In FIGS. 1 and 2, the aforedescribed shifting movement M2 is a turning-type shifting movement involving turning the bottom portion 31 of an upper receptacle 30 generally in a horizontal plane about a generally vertical axis K thereof relative to a like lower receptacle in position TP in FIG. 2 from unshifted position P1 to shifted position P2. This turning is through a very small angle, substantially less than half the subtended central angle from the generally vertical axis K to any two adjacent corners formed by the parallelogram shape of bottom portion 31.

In FIGS. 1–3, the geometric outline shape of bottom portion 31 may take the form of any suitable parallelogram whether it be a parallelogram with two angles less than 90°, a rectangle, or the specific square shape shown in FIG. 1. The receptacle has four side wall portions 33 with one on each parallelogram side. Also, the upper and lower tiering support portions 40 and 44 have a definite structural relationship. In a horizontal plane, diagonally opposite portions 40 are generally parallel, and this same relationship is also true of diagonally opposite portions 44. As will be apparent hereinafter, this description of the structure in this paragraph and in the preceding paragraph applies equally well to the same named parts and movements in FIGS. 4–17.

In FIGS. 1–3, each receptacle has four different tiering positions TP and four different nesting positions NP with respect to its adjacent receptacle. The positions in each group of four positions are spaced 90° apart about the vertical axis K. This is true because the edges of the bottom periphery 32 are each of approximately equal length, the edges of the top periphery 36 are each of approximately equal length, and both peripheries 32 and 36 are each approximately square. As will be apparent hereinafter, the description in this paragraph applies equally well to the same named parts in FIGS. 9–17.

Each receptacle 30 in FIGS. 1–3 has on it four side wall portions 33 respectively four upper and four lower tiering support portions 40 and 44 with each including a laterally extending protrusion 41 or 45 extending laterally from the surface to its associated sheet-like member 34 of the side wall. Protrusion or off-set 41 in each support portion 40 forms opening notch 42, including an outwardly opening notch portion 42a formed by its inner surface and including an upwardly opening notch portion 42b. Portion 42a is adapted to receive the corresponding hook or protrusion 45 of support portion 44 on an upper like receptacle when two receptacles are in tiering position TP, as shown by the upper two receptacles in FIG. 2. Then, notch portion 42b and notch 46 of tiering support portions 40 and 44, located respectively at one end of notch portion 42a and hook 45, interlock like notches in egg carton dividers, as shown in FIG. 3a.

Each like receptacle 30′ in FIGS. 4–8 has bottom portion 31′, receptacle encircling bottom and top peripheries 32′ and 36′, four side wall portions 33a′ and 33b′, upper edges 38′, four upper tiering support portions 40′ each including a notch 32a′ or 42b′, four lower tiering support portions 44′ each at a corner 47a′ or 47b′ of bottom periphery 32′, and clearway 50′. Each side wall portion 33a′ and 33b′ includes a sheet-like member 34′ and a bead 35′.

Upper receptacle 30′ is moved from tiering position TP in FIG. 5 to nesting position NP in FIG. 7 in generally the same manner as described in FIGS. 1 and 2 by a raising movement M1 to an unshifted position P1, turning type shifting movement M2 about vertical axis K to shifted position P2, and lowering movement M3 to nesting position NP. Top periphery 36′ is rectangular to provide easily loading and unloading of receptacle 30′ (but it should be apparent that the top could be any parallelogram shape, if desired), and bottom periphery 32′ has one pair of opposite sides 32a′ longer than the second pair of opposite sides 32b′ with angle D in FIG. 6 of two diagonally opposite parallelogram corners 47b′ less than a right angle in bottom periphery 32′ so that the angles at corners 47a′ are greater than a right angle. This construction permits a minimum amount of shifting movement M2 to be required because longer sides 32a′ of this parallelogram on the upper receptacle in position TP lead this angle D in generally the direction of shifting movement M2 toward shifted position P2. If corner angles D were instead right angles and bottom 31′ were a rectangle, a longer path of shifting movement M2 would be required.

The interior shape of each receptacle 30′ readily lends it to be a banana storing box because of its generally rectangular top outline.

Also, each pair of receptacles 30′ have only two possible tiering positions TP 180° displaced, and only two possible nesting positions NP 180° displaced because of the rectangular top periphery 36′ and of the parallelogram shape of bottom periphery 32′ with angles D less than 90°.

The tiering position TP in FIG. 5 shows the structural relationship between tiering support portions 40′ and 44′. Each lower tiering support portion 44′ extends along a line E in bottom periphery 32′ and each upper tiering support portion extends along a line F in top periphery 36′. These lines E and F in FIG. 6 extend non-parallel and non-perpendicular and are in vertically spaced apart, horizontal and parallel planes on each receptacle 30′ with corresponding portions thereof vertically aligned at intersection G. This construction permits the receptacles to occupy the tiering position TP in FIG. 5 with each upper tiering support portion 40′ being an upwardly opening notch 42a′ or 42b′ in an edge of top periphery 36′ to receive corner 47a′ or 47b′, formed by the intersection of its sheet-like members 34′, of bottom periphery 32′ of an upper like receptacle as a lower tiering support portion 44′. Since the receptacles are vertically aligned in tiering position TP in FIG. 5, lines E and F and intersection G bear the same relationship in a single plane in FIGS. 5 and 6 as they do on any one receptacle 30′. It will be apparent hereinafter that the description of the structure in this paragraph also applies generically to the same named parts, lines and intersections in FIGS. 9–24.

The minimum lengths of notches 42a′ and 42b′ bear a definite relationship. FIGS. 4, 5, 6 and 7 will reveal that notches 42a′ and 42b′ have length dimensions measured in a horizontal plane along the edges of top periphery 36′ in the plane of sheet-like member 34′. These notches have as a minimum these length dimensions in approximately the same relative ratio as the lengths of their respective parallelogram sides 33a′ and 33b′ measured in a parallel and horizontal plane so that like receptacles 30′ can assume tiering position TP in FIG. 5. It should be readily understood that any of these notches may be made of longer length and the receptacles may still be put in tiering position TP, but if too many of the notches are made longer than this minimum length, there may be excessive relative movement between the tiered receptacles in a horizontal plane because the notches will not engage the side wall portions of the upper receptacle to keep the receptacles firmly and vertically aligned. As will be apparent hereinafter, the description of the structure in this paragraph applies equally well to the same named parts and positions in FIGS. 9–17.

In nesting position NP in FIG. 7, laterally projecting beads 35′ determine the nesting level by serving as nesting stop portions protruding outwardly from sheet-like members 34′ on the side wall portions 33a′ and 33b′ for engaging upper edges 38′ on a lower like receptacle in nesting position NP to determine the nesting level. An inspection of the drawings will reveal that this description in this paragraph applies equally well to the same named parts and positions in FIGS. 9–23.

FIGS. 9–13 illustrate like receptacles 130 each having bottom portion 131, receptacle encircling bottom and top peripheries 132 and 136, four side wall portions 133, upper edges 138, four upper tiering support portions 140 each including a notch 142, and four lower tiering support portions 144 each including a corner 147 of bottom periphery 132, and clearway 150. Each side wall portion 133 includes a sheet-like member 134 and a bead 135.

Figure 11:
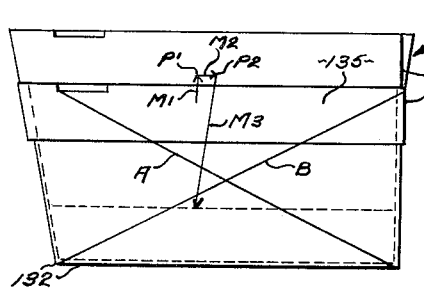
FIG. 11 is a perspective view of two like receptacles of the type shown in FIG. 9 in the tiering position.
Figure 12:
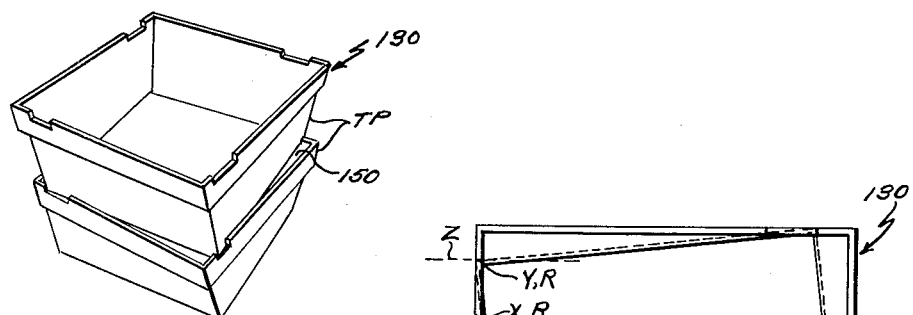
FIG. 12 is a side elevational view of the two receptacles from FIG. 11 in nesting position.

Receptacles 130 are adapted to be placed in tiering position TP in FIG. 11 and nesting position NP in FIG. 12 in generally the same manner as previously described.

Each corner angle in each of the corners of the top periphery 136 and in bottom periphery 132 is approximately 90°, and each periphery is generally square in shape.

Each notch 142 has a shape distinctive from that found in FIGS. 14–16. FIG. 10 reveals that the inner and outer faces of side wall portions 133, formed by sheet-like members 134 and beads 135, form concentric squares in a plane through the bottoms of notches 142 of upper tiering support portions 140. Each notch 142 has parallel opposite edges 142a and 142b in FIG. 9 of approximately equal length and extending upwardly from opposite ends of its lower surface 142c. Receptacle 130 is dimensioned so that the edges of the encircling bottom periphery 132 of the upper receptacle in FIGS. 11 and 13 in tiering position TP extend diagonally along line E across substantially the full length of lower surfaces 142c extending along line F between notch edges 142a and 142b, so that these notch edges firmly position the upper tiered receptacle, as previously described for FIG. 5.

FIGS. 14, 15 and 16 disclose respectively portions of like receptacles 230, 330 and 430 with each of these receptacles having exactly the same structure as receptacle 130 except for the shape of upper and lower tiering support portions 140 and 144.

In FIG. 14, each like receptacle 230 has notch 142 and corner 147 in respectively upper and lower tiering support portions in the same manner as in FIG. 13. However, each receptacle 230 includes in each of its four pairs of tiering support portions a laterally extending protrusion 241 or 245 respectively inwardly extending and outwardly extending from the surface of its associated sheet-like member 134. Each protrusion forming a horizontal, continuous, planar extension of the bottom surface 142c of either notch 142 or bottom portion 131 at corner 147. These protrusions permit engagement of tiering support portions in tiering position TP along a greater engagement surface area, as illustrated in FIG. 14, or with less twist or "warp" to the side wall portions 133 than would otherwise be required.

FIG. 15 discloses like receptacles 330 in tiering position TP. Here, each of its four upper tiering support portions includes upper notch 342 having a stepped lower surface with higher step surface 342c and lower step surface 342d. One of these step surfaces is advanced in generally the direction of shifting movement M2 from the other step surface so that each of the four corners 147 in the upper receptacle in FIG. 14 is guided in its movement into tiering position TP by dropping movement of its corner 147 from the higher steps 342c to the lower steps 342d in tiering position TP. This construction provides a "lead-in action" to aid in the final seating by requiring a slight twist along the arc and in the direction of the shifting movement M2 to bring the upper receptacle down into final seating in tiering position TP.

FIG. 16 shows like receptacles 430 in tiering position TP. Each of its four upper tiering support portions includes upper notch 442 having a beveled edge surface 442a on one of its sides. In each notch, this surface 442a is downwardly inclined and advanced along the arc of shifting movement M2 toward its lower surface 442c. When the upper receptacle is lowered toward tiering position TP, these guide surfaces or edges 442a will guide the four corners 147 during movement in the direction of shifting movement M2 downwardly along the inclines onto the lower surfaces 442c into tiering position TP.

FIGS. 15 and 16 reveal that lower surfaces 342d and 442c are advanced in the direction of shifting movement M2 with respect to upper surface 342c and inclined surface 442a respectively. Therefore, when each upper receptacle is being moved into the tiering position TP, it must be swung about vertical axis K in the same direction as previously described for shifting movement M2 until it reaches tiering position TP directly below unshifted position P1. However, it should be readily understood that basically the same advantages would be obtained by having higher step 342c and beveled edge surface 442a located respectively on the opposite ends of lower step 342d and lower surface 442c so as to be in a position advanced in generally the direction of shifting movement M2 along the arc of the shifting movement instead of in the opposite direction, as illustrated in FIGS. 15 and 16. Then, the upper receptacle would be swung into tiering position TP by movement opposite to shifting movement M2.

Figure 10:
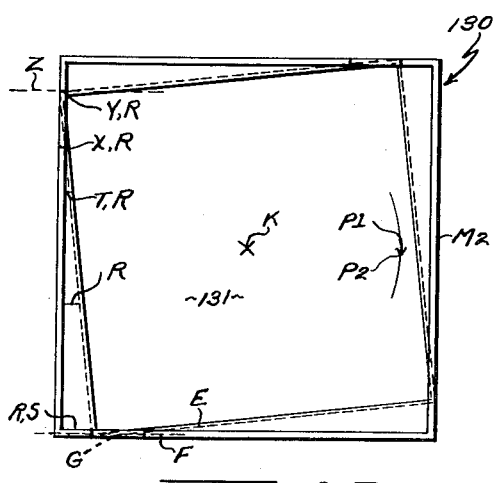
FIG. 10 is a top plan view of the receptacle in FIG. 9.

Receptacle 130' in FIG. 17 generally resembles receptacle 130 in FIG. 9 with its exterior surfaces generally coinciding in a similar manner so as to make possible placement of like receptacles in tiering position and in nesting position, and to move these receptacles between these positions. Receptacle 130' has a metal sheet 131a' secured to an encircling wire frame 132a' to provide a bottom portion 131' and a receptacle encircling bottom periphery 132'. Four corner wires 160' are secured to upper and lower framing wires 161' and 135' and to bottom frame wires 132a' to form four side wall portions 133', receptacle encircling top periphery 136', upper edges 138', four upper tiering support portions 140' each having notch 142', four lower tiering support portions 144' each at a corner 147' of bottom periphery 132', and clearway 150'. Sheet 131a' and frame 132a' form lower tiering support portions 144' with one at each corner 147'. The lower surface of wire 135' serves as the bead to determine the nesting level in the same manner as the earlier described beads. Side wall portions 133' and upper tiering support portions 140' are formed of bent wire.

FIGS. 18–23 illustrate like receptacles 530. This receptacle has a bottom portion 531 of the geometric shape of a trapezoid, three side wall portions 533a and 533b with a portion 533a located on each non-parallel trapezoid side and portion 533b located on the shortest parallel trapezoid side, receptacle encircling bottom and top peripheries 532 and 536 with the top edge over the open side shown in dot-dash line in FIG. 18, upper edges 538, three upper tiering support portions 540a and 540b with two portions 540a each including a notch 542, three lower tiering support portions 544a and 544b with each portion 544a including one of the corners 547 of bottom periphery 532, and clearway 550. The longer parallel trapezoid side of base portion 531 has thereover an opening 565. FIG. 20 reveals that the edges of upper tiering support portions 540a and lower tiering support portions 544a converge in the same direction.

Like receptacle 530 may be placed in tiering position TP in FIG. 21 in the same manner as earlier described. In tiering position, the upper and lower receptacles will be locked against substantial relative horizontal movement because the two notches 542 closely straddle corners 547. The other upper tiering support portion 540b merely engages against the flat bottom surface 544 on the bottom of bottom portion 531' to vertically support it. Hence, only the two notches 542 are required as upper tiering support portions. Hence, this same relationship of requiring only two properly placed upper tiering support portions is true for all forms of the receptacles illustrated in FIGS. 1–24 with these two preventing substantial relative horizontal movement between the receptacles in tiering position. However, in FIG. 21, the opposite ends of notch 540b on the lower receptacle straddle opposite side wall portions 533a on the upper receptacle to help prevent this horizontal movement.

The upper receptacle may be moved to nesting position NP in FIG. 22 by any of three different types of movements shown in FIG. 23 but with each taking generally the same movement action as earlier described. Opening 565 is dimensioned to provide the dual functions of permitting moving bottom portion 531 of the upper receptacle in FIG. 21 from tiering position TP to nesting position NP, and providing an open access side to reach articles on bottom portion 531 of the lower receptacles in tiering position TP in FIG. 21.

There are the three different movement paths for moving the upper receptacle in FIG. 21 to the nesting position in FIG. 22. First, a "horizontal shuffle movement" may be used wherein bottom portions 531 of the upper and lower receptacles always remain parallel. The upper receptacle is moved vertically upwardly from the upper cross sectioned position in FIG. 23 by raising movement M1' to unshifted position P1', is moved horizontally by a linear shifting movement M2' to a shifted position P2', and is lowered to the nesting level in the solid line position in FIG. 23 by a diagonal lowering movement M3'. Second, upper receptacle 530 is moved from the FIG. 21 to the FIG. 22 position by an "end nesting" action through opening 565 in the lower receptacle with bottom portions 531 of both the upper and lower receptacles always remaining generally horizontal so that articles carried thereby will not tend to be displaced from bottom portion 531 upon which they rest. Now, upper receptacle 530 is moved vertically upwardly by raising movement M1' to unshifted position P1'; is moved along path M2'' horizontally toward the right to the double dot-dash line position, vertically downwardly to the dot-dash line position, and then toward the left with bottom portion 531 of the upper receptacle resting upon the lower edge of opening 565 in the lower receptacle until they reach the shifted position P2''; and moved downwardly by diagonal lowering movement M3'' to nesting position NP (FIG. 23). Third, the upper receptacle may be moved from the FIG. 21 to the FIG. 22 position by rotational movement of the upper receptacle about its horizontal axis Q in FIG. 23 at the appropriate time. Here, the path of the lower rear edge of the upper receptacle is traced because it has the greater movement. Now, this rear edge is moved vertically upwardly by the same raising movement M1' to an unshifted position P1a wherein the bottom portions 531 of both receptacles are parallel; swung counterclockwise about horizontal axis Q by a swinging shifting movement M2a to a shifted position P2a shown in dotted lines; and moved downwardly to nesting position NP by vertically lowering movement M3a and clockwise swinging lowering movement M3b.

As will be apparent hereinafter, the description of the structure and mode of operation for FIGS. 18–23 in the preceding paragraphs applies equally well to the same named parts, positions, directions and movements with respect to the receptacle in FIG. 24.

Receptacle 530 in FIGS. 18–23 also has additional specific structure and uses not previously mentioned. Each side wall portion 533a or 533b has a sheet-like member 534 and a framing bead 535 extending laterally therefrom. Bottom 531 has extending therefrom, and located under opening 565, a turned up portion 531b, which has sheet-like member 534 and bead 535 the same as side wall portions 533a. Receptacle 530 may be used in tiered position TP in FIG. 21 as assembly line parts bins or kitchen vegetable bins, and used in nesting position NP in FIG. 22 to permit them to be easily stored and shipped in minimum space.

Receptacle 530' in FIG. 24 closely resembles receptacle 530 in structural outline and in movement between tiering and nesting position except that receptacle 530' has its upper tiering support portions and side wall portions being formed of bent wire. The surfaces of the wires in FIG. 24 conform with the corresponding surfaces on receptacle 530 in FIG. 18. Receptacle 530' has a sheet 531a' and a wire frame 532a' secured together and forming bottom portion 531' and receptacle encircling bottom periphery 532'. Two bent wires 561' and bent wire 563' have their ends welded or otherwise secured to wire frame 532a' to form side wall portions 533a' and 533b', receptacle encircling top periphery 536' formed partially by the wire of the receptacle and by dot-dash outline, upper edges 538', upper tiering support portions 540a' and 540b' with each portion 540a' having a notch 542', lower tiering support portions 544a' and 544b' with each portion 544a' located at a corner 547' of bottom periphery 532', clearway 550' and opening 565'. In tiering position, notches 542' and the top of upper tiering support portion 540b' are adapted respectively to straddle corners 547' and to support and engage the under surface of bottom portion 531' at portion 544b'. To aid in nesting, two wires 561' may have their vertical legs diverging in the downward direction while wire 563' may have its downwardly diverging legs slightly inclined upwardly and rearwardly from the vertical with respect to bottom portion 531' if it is desired to have like receptacles 530' to be vertically aligned in nesting position.

Each of the receptacles described has had one or more warped side wall portions. This "warp" has been needed to bring each lower tiering support portion inwardly in one direction (see the left side of FIG. 7) from a corner of the top periphery and into vertical alignment with an upper tiering support portion. FIGS. 4, 6, 25 and 26 will be referred to for describing in more detail the nature of this "warped" surface. In FIGS. 4 and 6, the lower edge of each sheet-like member 34' is common to an edge of bottom portion 31'. Inner surface 34a' and also the outer surface, of this uniformly thick sheet-like member 34' each form at least a portion of a surface generated by a generally straight line R in FIGS. 4 and 6 movable in a smooth and progressive manner from one position S (diverging outwardly in FIGS. 4, 5, 6 and 30 from a perpendicular V to bottom portion 31' in the direction upwardly from bottom portion 31' contiguous to one end of sheet-like member 34') toward the other end of the sheet member through position T diverging outwardly in FIGS. 5 and 34, through position X perpendicular to bottom portion 31' in FIGS. 5, 6 and 31 to position Y diverging inwardly from this perpendicular in FIGS. 4, 5, 6 and 32. During this movement, straight line R intersects inner surface 34a' in generally parallel planes, such as plane Z in FIGS. 6 and 32, each extending generally perpendicular to bottom portion 31'. Vertical line V has been included for angular reference in FIGS. 30–34. Note that sheet-like member 34' thus developed (consider bead 35' omitted) has at least three of the aforedescribed tiering support portions at its edges and has a corner of top periphery 36' generally forming corners of a warped rectangle having straight diagonals A and B in FIGS. 7, 25 and 26 linear in form and non-coplanar. Any one surface of sheet-like member 34', such as inner surface 34a' is convex along one diagonal B and concave along the other diagonal A of this rectangle, as shown respectively in FIGS. 26 and 25. It should be apparent that this description of the warped surface in this paragraph also applies to all the side wall portions in FIGS. 1–17, and to the side wall portions 533a and 533a' in FIGS. 18 and 24, whether they have sheet-like members in FIGS. 1–16 and 18–23 or have wire-type frameworks in FIGS. 17 and 24.

Different forms of the invention use different portions of this aforedescribed generated surface from position S at one end to its intersection with plane Z, one of these aforementioned parallel planes, extending vertically through a corner, such as corner 47a' in FIGS. 4, 5 and 6. Three examples will be given for illustration purposes. First, in FIGS. 4–24, position Y is in plane Z. Then, these warped shapes bring lower tiering support portions 44' in FIGS. 4 and 5 on the corners of bottom periphery 32' inwardly from the corresponding corners in top periphery 36' so as to be inwardly (at the left in FIG. 7) in one direction from the corresponding corners along the top periphery and tending outwardly (in FIG. 32 and at the right in FIG. 8) in a generally angled direction to said top periphery to a point of adequate vertical obstruction with upper tiering support portions 40' in the lower receptacle. It should be noted that if bead 35' were of smaller horizontal thickness in FIG. 32, each lower support portion 44' might be radially (with respect to perpendicular V) outside each upper support portion 40'. Note, in the top plan views in FIGS. 6, 10 and 20, corners of the respective bottom portions 31', 131 and 531 (located under notches 42a' or 42b', 142 and 542) are not visible. This condition depends on the location of generating line R in position Y in plane Z, the thickness of material, the existence of outside protuberances on the side wall portions, and the degree of warp of the side wall portions. Second, in FIGS. 1–3a and 33, surface generating line R is in position X in plane Z, and the portion of the generated surface in FIG. 5 between position X and Y is not used. Since the full top width of the side wall of the lower receptacle engages in FIG. 33 the bottom of the top receptacle, offsets 41 and hooks 45 may not always be needed. Third, from a theoretical standpoint, it might be possible to have receptacles 30' spaced vertically apart in tiered position with only the minimum engagement shown with surface generating line R located in plane Z either in diverging position T in FIG. 34 or in perpendicular position X in FIG. 31. Then, only the generated surface portion between either positions S and T or positions S and X is used. In FIG. 34, the inner edge of the top edge is vertically aligned with the outer edge of the bottom edge so that location of position T is determined by the thickness of the sheet-like side wall portion. However, if this minimum engagement is used, it may be required as a practical matter to provide interengaging locking members, such as ones similar to locking offsets 41 and hooks 45 in FIG. 33, to prevent falling of the tiered receptacles to nested position upon slight turning movement M2 about vertical axis K.

In each of these three examples generic structure exists. First, on any one receptacle, corresponding lower tiering support portions are substantially vertically beneath corresponding upper tiering support portions. Second, when two receptacles are in the tiering position, a definite structural relationship between side wall portions exists. Each side wall portion extends along a series of one or more parallel lines, each similar to line E, in the bottom periphery and extends along another series of one or more parallel lines, each similar to line F, in the top periphery. These two series of lines extend non-parallel and non-perpendicular and are in vertically spaced apart, horizontal and parallel planes on each tiered receptacle with corresponding portions thereof vertically aligned at an intersection, such as intersection G. This intersection may be located anywhere along the length of each side wall between position T in FIG. 34 and position Y in FIG. 32, and located anywhere transverse to each side wall between its inner edge in FIG. 34 and well outside the outer edge of sheet-like member 34' and on bead 35', as shown by the intersection G' in FIG. 32 of the outermost lines.

Line R at position S has a smaller acute angle with respect to the plane of the bottom portion in FIGS. 4 and 6 than the corresponding angle in FIG. 1. This smaller angle results from increased "twist" or "warp" and provides some advantages in FIGS. 4–24. Protrusions 41 and 45 in FIG. 1 may be eliminated, or greater tiering engagement surface will be obtained, as shown by protrusions 241 and 245 in FIG. 14. This greater twist also allows deeper nesting, and permits the actual corners 47a' or 47b' in FIG. 5 of bottom portion 31' to be used as the actual lower tiering support portions 44'. This is true in FIGS. 4–24.

If this warp is sufficiently great, it is possible to have downwardly and outwardly extending outer surfaces on the side wall portions without interfering with the nesting action, as shown by acute angle W in FIG. 7 of less than 90° between the right-hand side wall portion 33b' and bottom portion 31'. Angle W is formed in a plane, the same as plane Z in wall 33a', extending generally perpendicular to bottom portion 31' and one of the side wall portions, such as right-hand side wall portion 33b' in FIG. 7, extending through corresponding upper and lower tiering support portions 40' and 44' at intersection G associated with side wall portion 33b', and intersecting one of the faces, such as the outer face, of this side wall portion 33b' along a line forming angle W with bottom portion 31'. The description of this structure in this paragraph also applies generically to all of the receptacles shown in FIGS. 4–24. Each preferably uses this relationship so as to use a corner of its bottom periphery as its lower tiering support portion vertically aligned with a notch in its top periphery serving as an upper tiering support portion.

In contrast with acute angle W in FIG. 7, angle C in FIG. 2 (also in plane Z in FIG. 3) is 90° because each hook 45, forming lowering tiering support portion 44, extends outwardly from the plane of the outer surface of its associated side wall portion 33.

FIGS. 7, and 27–29 reveal that the dimensions of receptacle 30' cause the like receptacles in nesting position NP to advance progressively in approximately equal increments in the upward direction in generally the direction of shifting movement away from the unshifted position. However, in spite of this advance by increments, the stacks of nested like receptacles will fit snugly in side-by-side relationship with minimum waste of space because their complementary side contours interfit, as shown in FIG. 28. The description of the aforedescribed structure in this paragraph applies equally well to the same named parts and directions in FIGS. 1–24. In FIGS. 1–17, the advance is a twist about vertical axis K in the direction of arcuate shifting movement M2. This advance is also shown in FIGS. 2, 7 and 12 by the horizontal distance across the top periphery on the upper receptacle in tiering position TP being greater than the same distance on the lower receptacle because the dimension on the upper receptacle is measured closer to diagonally across top corners thereof. In FIGS. 18–24, the advance is generally in the direction of horizontal shifting movement M2' or M2" in FIG. 23, as shown in FIG. 22.

Consideration of the structure in FIGS. 9–12 will reveal that the direction of rotation of turning-type shifting movement M2 may be reversed by simply reversing the position of the upper tiering support portions 140 and the warp of the side wall portions 133 in relation to their respective lower corners 147. It should be apparent that this description of the structure in this paragraph applies equally well to the same named parts in FIGS. 4–8, and 13–17.

Various changes in details and arrangement of parts may be made by one skilled in the art without departing from either the spirit of this invention or the scope of the appended claims.

What is claimed is:

1. A receptacle adapted for tiering and nesting with other like receptacles and having a bottom portion, means defining upper edges lying generally in a plane parallel to and spaced above said bottom portion, side wall portions rigidly connecting said bottom portion and upper edges, a plurality of upper tiering support portions rigid with said upper edges, a plurality of lower tiering support portions rigid with said bottom portion, corresponding lower tiering support portions being substantially vertically beneath corresponding upper tiering support portions, the dimensions of the upper edges and bottom portion of said receptacle permitting the bottom portion of an upper receptacle to enter into a lower like receptacle, in tiered position said lower tiering support portions of an upper receptacle being positioned to rest vertically upon said upper tiering support portions of a lower like receptacle with the perimeter of said upper receptacle substantially vertically aligned above the lower receptacle, and after shifting movement from said tiered position there being a clearway from the level of each of said upper tiering support portions down to that nesting level in the receptacle occupied by the lower tiering support portions of a like receptacle when two like receptacles are in nesting position, said side wall portions being so constructed and arranged that two like receptacles will nest one within another, at least two lower tiering support portions and their corresponding two upper tiering support portions forming two pairs of tiering support portions with a substantially vertically aligned upper and lower portion in each pair, the corresponding upper portion and lower portion in each pair extending non-parallel.

2. A receptacle, as set forth in claim 1, with the portions in one plurality in said pairs being generally parallel.

3. A receptacle, as set forth in claim 1, with the portions in the other plurality in said pairs being generally parallel.

4. A receptacle, as set forth in claim 1, with the portions in one plurality in said pairs converging.

5. A receptacle, as set forth in claim 1, with the portions in the other plurality in said pairs converging in the same direction as the portions in said one plurality.

6. A receptacle adapted for tiering and nesting with other like receptacles and having a bottom portion, means defining upper edges lying generally in a plane parallel to and spaced above said bottom portion, side wall portions rigidly connecting said bottom portion and upper edges, a plurality of upper tiering support portions rigid with said upper edges, a plurality of lower tiering support portions rigid with said bottom portion, corresponding lower tiering support portions being substantially vertically beneath corresponding upper tiering support portions, the dimensions of the upper edges and bottom portion of said receptacle permitting the bottom portion of an upper receptacle to enter into a lower like receptacle, in tiered position said lower tiering support portions of an upper receptacle being positioned to rest vertically upon said upper tiering support portions of a lower like receptacle with the perimeter of said upper receptacle substantially vertically aligned above the lower receptacle, and after shifting movement from said tiered position there being a clearway from the level of each of said upper tiering support portions down to that nesting level in the receptacle occupied by the lower tiering support portions of a like receptacle when two like receptacles are in nesting position, said side wall portions being so constructed and arranged that two like receptacles will nest one within another, at least two lower tiering support portions and their corresponding two upper tiering support portions forming two pairs of tiering support portions with a substantially vertically aligned upper and lower portion in each pair, said bottom portion having four substantially straight sides, said means defining upper edges having four substantially straight sides respectively paired with said bottom portions sides, and in the case of at least two of said last-named pairs the respective sides being non-parallel.

7. A receptacle as defined in claim 6 wherein said shifting movement involves turning the bottom portion of said receptacle generally in a horizontal plane about a generally vertical axis thereof, and the amount of said shifting movement between tiered and nested positions being not substantially greater than one-half the subtended center angle from said generally vertical axis to any two adjacent corners of said receptacle.

8. A receptacle as defined in claim 6, wherein said upper and lower tiering support portions have interengaging parts in tiered position of two like receptacles preventing relative shifting laterally between said tiered receptacles.

9. A receptacle as defined in claim 6, wherein said corresponding tiering support portions at one level are at the corners of said receptacle, and the corresponding tiering support portions at the other level are spaced from the corners.

10. A receptacle as defined in claim 6 wherein at least one side thereof is sufficiently open to permit removal therethrough of articles stored in the lower one of two like receptacles in tiered position.

11. A receptacle as defined in claim 6 and formed of sheet material.

12. A receptacle as defined in claim 6 and formed of separated elements such as individual wires.

References Cited in the file of this patent
UNITED STATES PATENTS

| | | |
|---|---|---|
| 2,774,511 | Menkin et al. | Dec. 18, 1956 |
| 2,813,656 | Anderson | Nov. 19, 1957 |
| 2,931,535 | Lockwood | Apr. 5, 1960 |